March 10, 1953         M. A. BECK         2,630,627
PANEL CUTTER
Filed Sept. 13, 1949
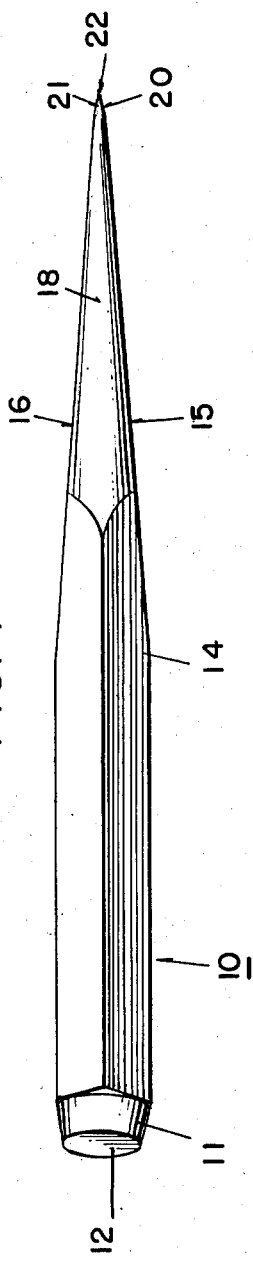
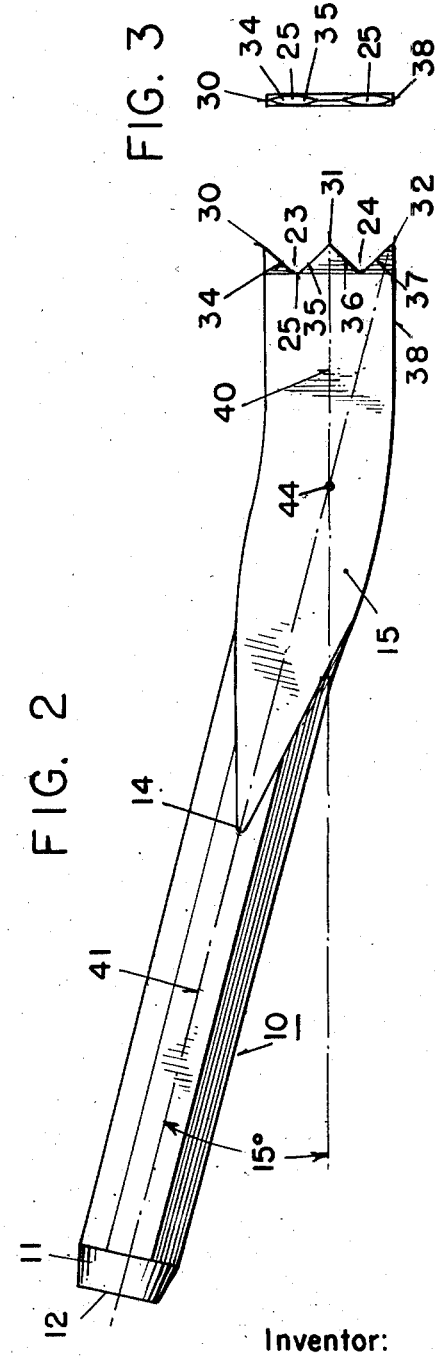
Inventor:
MARTIN A. BECK,
By Henry H. Snelling
Attorney Patented Mar. 10, 1953

2,630,627

UNITED STATES PATENT OFFICE 2,630,627

PANEL CUTTER

Martin A. Beck, York, Pa.

Application September 13, 1949, Serial No. 115,482

4 Claims. (Cl. 30—168)

This invention relates to panel cutters and has for its principal object the provision of a one-piece panel cutter which is particularly easy to use by virtue of its angular relationships and one which can follow with ease an irregular shape cut.

A further object of the present invention is to provide a panel cutter in which a face of the tool makes a cut while that face is perpendicular to the panel or other work while an adjacent face guides the tool and is parallel to the surface of the work.

An incidental feature of the invention is the provision of a panel cutter of round or other uniform diameter stock tapered to form a blade ending in a knife edge, which knife edge is serrated to form a starter point and a cutter point each having an inside face at an angle of 45° to the axis and having between them a right angular central point, one of the two faces of the latter serving as a stop portion in making the starting or penetrating cut and the other serving as a guide portion while increasing the cut.

While there are many panel cutters on the market which do fairly good work, the present cutter is found to be exceptionally convenient of operation partly because of the angle between the shaft and the blade and partly because of the two 90° indentations in the knife edge of the blade. The present cutter is primarily intended to cut sections out of automobile bodies such as quarter panels, cowl panels, rocker panels, door panels outside or inside, tail pans, etc., and is convenient for cutting out turret tops and to cut any section of a panel that is to be replaced by a new section. While primarily intended for automobile use as stated, the scope of protection is to be measured by the claims and to cover any use wherein a cut is to be made following a predetermined pattern.

In the drawings:

Figure 1 is a top plan view.

Figure 2 is a side view.

Figure 3 is an end view.

The panel cutter is a one-piece tool formed of rounded or hexagonal stock which forms the shaft 10 preferably tapered as at 11 in usual fashion, forming a round head 12. From the point 14 the stock is tapered as at 15 and 16 to form a wedge-shaped blade 18. The sides 15 and 16 are again tapered as at 20 and 21 to a knife edge 22. For a ¾" diameter stock the smaller taper 20 and 21 is about a quarter of an inch long and the blade at this point is about one third wider than the diameter of the stock being an inch wide. The knife edge 22 is actually merely the line of three points 30, 31 and 32. These points are formed by two equal rightangular indentations 23 and 24, each being centrally rounded as at 25 to avoid a sharp reentrant angle. The radius of such portion 25 is very slight, being in the nature of $\frac{1}{16}$ of an inch. The thickness of the blade at the bottom of each indentation is about $\frac{1}{16}$ of an inch so that four faces are formed, each being triangular, widest at the point 25 and tapering to the three points mentioned. Reading from the top point 30 in Figure 2 (which would be the bottom point when the tool is making a cut in a panel) the points are cutter point 30, central point 31, and starter point 32. The face 34 is the cutter face, the face 35 is the guiding face, the face 36 is the stop face limiting the projection of the tool in starting, and the face 37 is one side of the starter point, the other side being the edge 38 of the blade.

While the tool could be operated with the configuration just described, I find the tool very appreciably improved by bending the tool so that the axis 40 of the blade makes an angle of 15° with the axis 41 of the shaft. The bend is a gentle one, the radius of the inside or cutter point side being about 3½" while the radius on the outer or starter point side is about 4½". This gives a shaft length about 6¼" and the blade length 1⅞", each measured from the point 44 where the axis 41 of the shaft meets the axis 40 of the blade. The drawings are to scale and are full size.

By virtue of the 15° bend, in starting a cut the axis of the shaft 10 is held at an angle of 60° to the work and the penetrating cut is made by gently tapping with a hammer in the most convenient position possible. The tool is now turned over and the axis of the shaft 10 is now held at an angle of 30° to the work at which time the face 35 rests firmly against the top of the panel and the cutting edge 34 projects thru the panel and is perpendicular to the two surfaces of the panel. The two flat sides 15 and 16 of the tool make it very easy to turn and guide the cutter in its work. A right angle, a curve, circle or straight line can be made simply by turning the tool with one hand while tapping it gently with a hammer held in the other hand. The V cutting edge is believed to be the best cutting edge that can be used.

What I claim is:

1. A one-piece hand tool of impact type for cutting holes of predetermined pattern in metal panels of automobiles, comprising a shaft of uniform bar stock, a head at one end of the shaft for receiving the blows of a hammer, and an angularly disposed, wedge-shaped blade at the other end of the shaft, said blade having two flat sides, the centerline of the blade making an angle of roughly 15° with the axis of the shaft as viewed looking at either of the two flat sides of the blade, thus forming a convex and a concave side of the tool, said blade having at its free end two teeth, the proximate surfaces of which are disposed at right angles to each other, one tooth surface forming a guiding, panel engaging face disposed at an angle of 45° to the centerline of the blade, and the other tooth surface being near the concave side of the tool and forming a cutting face, whereby when the shaft of the tool is held at an angle of 30° to the surface of the panel with the convex side of the tool farther from the panel surface than the concave side, the centerline of the blade will make an angle of 45° with the surface of the panel, the guiding face will be parallel to and slide on the panel surface, and the cutting face will be perpendicular to the panel surface.

2. A one-piece hand tool of impact type for cutting holes of predetermined pattern in metal panels of automobiles, comprising a shaft, a head at one end of the shaft for receiving the blows of a hammer, a wedge-shaped blade at the other end of the shaft, said blade having its lower operative end formed with a central tooth and two smaller flanking teeth at opposite sides of the central tooth, said teeth being formed by two equal indentations whose faces are at right angles to one another, said blade being more sharply tapered from the roots of the teeth to their points than from the shaft to the roots so as to form three points, four sloping, plane faces on the three teeth, each face making a 90° angle with the adjacent face, the axis of the blade being at an angle of about 15° to the axis of the shaft, thus forming a concave side and a convex side of the tool, the four faces being in order from the concave side of the tool, a cutter face, a guiding face, a stop face, and the side of a starter point on the convex side of the tool, and the three points in the same order being the cutter point, the center point, and the starter point, whereby as the shaft is held at an angle of about 60° to the work the central tooth will stop the penetration of the starting point and when the shaft is at an angle of about 30° to the work the central tooth will engage the work and guide the tool while the cutter face forms the cut.

3. The tool of claim 2 in which the four faces are isosceles triangular, the vertices of the triangles being at the cutting end of the tool and the bases of the triangles being at the roots of the teeth so the tips of the three points lie in a single plane, and the outside edges of the flanking teeth are parallel.

4. The tool of claim 1 in which the cutting face and the guiding face are each isosceles triangular, the vertices of the two triangles being at the cutting end of the tool, the base of the triangles being at the junction of the cutting face and the guiding face and being about one-fourth of the length of the side of the isosceles triangle.

MARTIN A. BECK.

REFERENCES CITED

The following references are of record in the file of this patent:

UNITED STATES PATENTS

| Number | Name | Date |
|---|---|---|
| 729,584 | Hill | June 2, 1903 |
| 964,393 | Clark | July 12, 1910 |
| 1,719,449 | Ranko | July 2, 1929 |
| 2,024,136 | Bardwell | Dec. 17, 1935 |
| 2,199,380 | Walraven | May 7, 1940 |
| 2,392,495 | Nameth | Jan. 8, 1946 |

FOREIGN PATENTS

| Number | Country | Date |
|---|---|---|
| 283,366 | Great Britain | Jan. 12, 1928 |
| 675,036 | France | Oct. 28, 1929 |